(12) United States Patent
Shitara et al.

(10) Patent No.: US 7,035,039 B2
(45) Date of Patent: Apr. 25, 2006

(54) MAGNETIC HEAD POSITIONING CONTROL DEVICE, MAGNETIC HEAD CERTIFIER, MAGNETIC DISK CERTIFIER AND HEAD CARTRIDGE

(75) Inventors: Kenichi Shitara, Kanagawa (JP);
Akihiro Matsumoto, Kanagawa (JP)

(73) Assignee: Hitachi Electronics Engineering Co., Ltd., Tokyo (JP)

( * ) Notice: Subject to any disclaimer, the term of this patent is extended or adjusted under 35 U.S.C. 154(b) by 234 days.

(21) Appl. No.: 10/309,882

(22) Filed: Dec. 5, 2002

(65) Prior Publication Data

US 2003/0128456 A1      Jul. 10, 2003

(30) Foreign Application Priority Data

Jan. 8, 2002    (JP)    ............................. 2002-001173

(51) Int. Cl.
*G11B 5/596*    (2006.01)
(52) U.S. Cl. ...................................... 360/77.07; 360/75
(58) Field of Classification Search ............. 360/77.07, 360/31, 75, 78.12; 318/652; 324/212, 210; 73/865.6; 356/507; 714/42
See application file for complete search history.

(56) References Cited

U.S. PATENT DOCUMENTS

| | | | | |
|---|---|---|---|---|
| 5,491,413 A | * | 2/1996 | Guzik | 324/212 |
| 5,998,994 A | * | 12/1999 | Mori | 324/212 |
| 6,006,614 A | * | 12/1999 | Guzik et al. | 73/865.6 |
| 6,023,145 A | * | 2/2000 | Karaaslan et al. | 318/652 |
| 6,646,436 B1 | * | 11/2003 | Mihara et al. | 324/212 |

FOREIGN PATENT DOCUMENTS

JP         10-106194         4/1998

* cited by examiner

*Primary Examiner*—K. Wong
(74) *Attorney, Agent, or Firm*—Mattingly, Stanger, Malur & Brundidge, P.C.

(57) ABSTRACT

A piezo actuator is provided between a suspension spring and a head carriage. When a predetermined track of a magnetic disk is accessed by positioning a magnetic head in the predetermined track, the piezo actuator maintains the magnetic head in an ON track state by dynamically moving a light weight head cartridge according to a servo information or dynamically moving a head assembly in the head cartridge according the servo information.

22 Claims, 5 Drawing Sheets

MAGNETIC HEAD POSITIONING CONTROL DEVICE, MAGNETIC HEAD CERTIFIER, MAGNETIC DISK CERTIFIER AND HEAD CARTRIDGE

DESCRIPTION

1. Technical Field

The present invention relates to a magnetic head positioning control device, a magnetic head certifier, a magnetic disk certifier and a head cartridge and, particularly, to a magnetic head positioning control device, which is capable of positioning a magnetic head in substantially a center of a track of a magnetic disk precisely at high speed and is suitable for use in a high density recording magnetic disk or in certification of a magnetic head, a magnetic head certifier using the same magnetic head positioning control device, a magnetic disk certifier using the same magnetic head positioning control device and a head cartridge for use in these devices.

2. Background Art

It has been known that, in order to perform a positional control of a magnetic head with respect to a track of a magnetic disk, a servo track writer is used to write a servo information (servo signal) on the track of the magnetic disk (referred to as merely "disk", hereinafter) mounted on a hard magnetic disk drive (referred to as "HDD", hereinafter) used for recording data in a computer system.

As a system for setting a servo information on a disk, there are a servo surface system in which a surface of only one of a plurality of disks is dedicated to the servo information and a data surface servo system (or sector servo system) in which the servo information is set in a track of every disk.

In a recent compact disk, it is usual that one or two disks are used and the servo information is set in each of the disks according to the data surface system. In the data surface servo system, identical servo information is set in each sector of each track on both surfaces of one disk. JPH10-106194A discloses an example of this kind of technique.

In a magnetic head certifier or a magnetic disk certifier, predetermined data is written in a track of a disk according to a servo information set on the disk and a performance test of the disk or the magnetic head is performed by reading the data.

As the magnetic head of the HDD, a complex magnetic head having a MR head, a GMR head or a TMR head (MR head will be referred to as a typical example, hereinafter) incorporated in a read out side thereof is used recently. Recording density of a disk is stably increasing to several Gbit/inch. Further, the number of tracks of the disk is increasing and the width of track is decreasing. Moreover, in the recent tendency, a single plate type HDD having a glass substrate the size of which is 3.3 inches or smaller is used.

Since the track width is decreased with increase of recording density in the magnetic disk device, a substantial improvement of preciseness of a head positioning is required in a magnetic head certifier or a magnetic disk certifier. Further, the rotation number of a disk is increased from 5400 rpm to a range from 7000 rpm to 10000 rpm, or more, recently.

An ON track positioning of a magnetic head (referred to as head, hereinafter) of a practical HDD, for positioning the head on a track of a disk substantially, is performed by reading out a servo information written in the track therefrom. In the practical HDD, the head is usually positioned by controlling a position of the head by moving the head by a voice coil motor such that the head becomes an ON track or nearly ON track condition with respect to an aimed track. In such case, however, it is impossible to precisely read/write data with respect to a sector in the vicinity of the track after this positioning is completed. In view of this, it is usual to read/write data of the same sector after the ON track positioning is performed for about one revolution of disk. However, when such read/write operation is performed by the certifier, it is necessary to wait for a time corresponding to about one revolution of disk every time when the data read/write is performed for each sector and so efficiency of test is lowered.

Particularly, when the rotation speed of a disk is increased, it is very difficult to perform a read/write of data with respect to a sector in the vicinity of the head position immediately after the positioning of the head is completed. It may take a time corresponding to more than about one revolution of the disk to perform the read/write operation after the positioning is completed. Further, when the ON track control is performed by a voice coil motor as in the case of the practical HDD, it is impossible to perform a highly precise, high speed test by the certifier.

Therefore, in a current magnetic head certifier or a magnetic disk certifier, the positioning of a head to a track of a disk in a position in a radial direction thereof is performed by using a head carriage having an X table movable in an X direction for moving a head radially of the disk to an aimed track thereof at high speed and a piezo stage track provided in the head carriage (on the X table) for finely adjusting the position of head in the aimed track. The piezo stage performs the ON track positioning of the head on the aimed track of the disk by finely adjusting the position of the head and the ON track positioning according to a servo signal as in the case of the practical HDD. The latter ON track positioning is performed by using a program executed by a MPU. This is usually performed by writing a servo signal in at least one position of one track, obtaining an amount of deviation of a head from the track by reading out the servo information written therein and adjusting the head position by driving the piezo stage correspondingly to the amount of the deviation.

The reason for the employment of the program processing for performing the ON track positioning control of the head is that, since response speed of the piezo stage is low compared with the head carriage, the piezo stage can not respond at high speed to the amount of deviation of the head, which is obtained correspondingly to the read-out servo signal, even if a control circuit is provided as a hardware.

Figure 4:
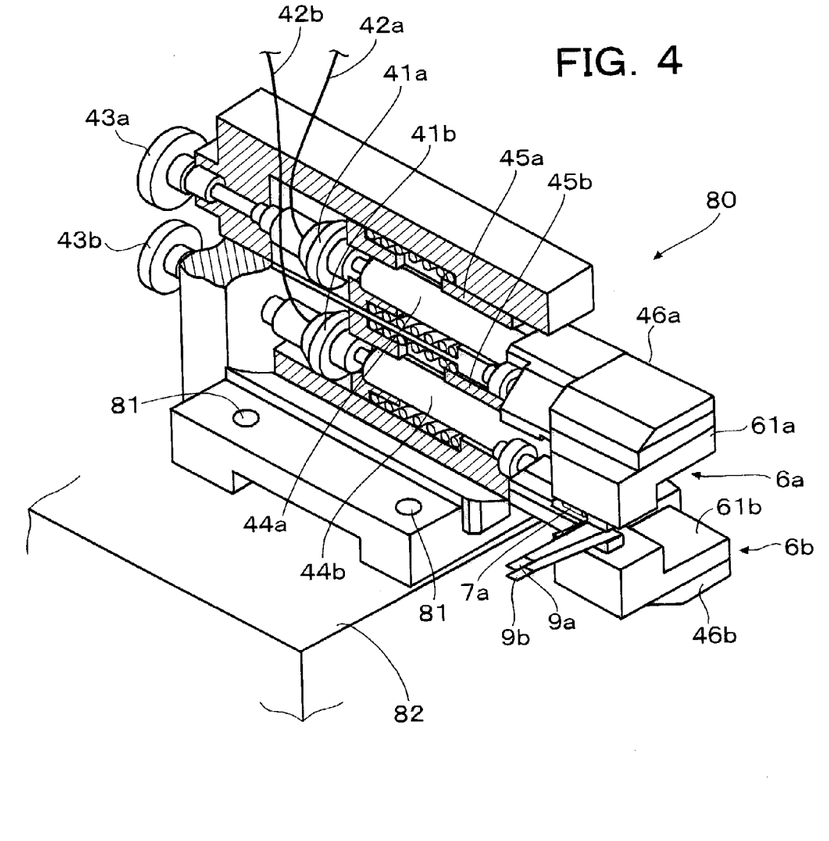
FIG. 4 is a perspective view of a piezo actuator and a head cartridge mounted on an Y stage.

U.S. Pat. No. 5,998,994, which is assigned to the assignee of this application, discloses a head carriage having a piezo stage of this type, which is shown in FIG. 2 thereof. The head carriage disclosed in U.S. Pat. No. 5,998,994 is shown in FIG. 4 of the drawings accompanied by this application. Therefore, the head carriage will be described with reference to FIG. 4. In FIG. 4, the piezo stage is constructed with piezo actuators 41a and 41b. The piezo actuators 41a and 41b move head assemblies, which include a suspension spring 8 and a head 9*a* and a suspension spring 8 and a head 9*b*, respectively, and mounting blocks 61*a* and 61*b* for mounting the head assemblies to support arms 46*a* and 46*b*, respectively. Therefore, the piezo stage is heavy and can not be quickly respond to the servo signal.

Further, with recent increase of the recording density of disk to several Gbit/inch or more, it is impossible to perform a highly precise head positioning due to such as undesired movement of a spindle due to eccentricity thereof regardless of time even if the fine adjustment of the head position by the piezo stage and the ON track positioning control are utilized. Therefore, probability of erroneous detection of data becomes high.

SUMMARY OF THE INVENTION

An object of the present invention is to provide a magnetic head positioning control device suitable for use in a magnetic disk or magnetic head certifier, which is able to dynamically position a head to a predetermined position of a track of a disk precisely at high speed, by solving the problems of the prior art.

Another object of the present invention is to provide a magnetic head certifier using the head positioning control device, which is able to dynamically position a head to a predetermined position of a track of a disk precisely at high speed.

Another object of the present invention is to provide a magnetic disk certifier using the head positioning control device, which is able to dynamically position a head to a predetermined position of a track of a disk precisely at high speed.

A further object of the present invention is to provide a head cartridge for use in the magnetic head positioning control device, the magnetic disk certifier and the magnetic head certifier, which is able to dynamically position a head to a predetermined position of a track of the head precisely at high speed.

In order to achieve these objects, a head positioning control device according to the present invention, for positioning a head in a predetermined track of a disk according to a servo information read out from the predetermined track of the disk, is featured by comprising a head cartridge for supporting the head through a suspension spring, a head carriage on which the head cartridge is mounted, a forward/backward actuator provided between the suspension spring and the head carriage and a control circuit for controlling the head such that the head is held on a predetermined position on the predetermined track of the disk by driving the forward/backward actuator correspondingly to an amount of positional deviation of the head from the predetermined track obtained according to the servo information read out by the head.

Further, in order to achieve the above object, a head certifier or a magnetic disk certifier is featured by comprising the magnetic head positioning control device, wherein, when a head is positioned on an aimed track of a disk, the head is held in a predetermined position on the aimed track correspondingly to an amount of positional deviation from the aimed track by the magnetic head positioning control device and the head or a magnetic disk is certified by reading data from the aimed track or writing data thereto.

Further, a head cartridge mounted on a head through the suspension spring, for use in the magnetic head positioning control device, the magnetic disk certifier or the head certifier, is featured by comprising the suspension spring movably supported by a base member of the head cartridge for moving the head in a direction crossing tracks of a disk and a piezo actuator for finely moving the head in the direction crossing the tracks of the disk by moving the suspension spring.

In the present invention, the forward/backward actuator such as the piezo actuator is provided between the suspension spring and the head carriage and the piezo actuator is driven according to the servo information. Thus, it is possible to dynamically move the light weight head cartridge or a head assembly composed of the suspension spring and the head in the head cartridge according to the servo information when the head positioned on a predetermined track accesses that track.

Since the piezo actuator is required to move the head by a distance as fine as, for example, several microns for correcting an amount of deviation of the head from a center of the track, a high speed response becomes possible.

The servo information written in respective sectors or in a plurality of locations of the track can be read out many times during one revolution of the disk, so that the amount of deviation of the head with respect to the track can be obtained many times during one revolution of the disk. Therefore, it is possible to correct the position of the head by moving the head to a predetermined position on the track of the disk, particularly, to an ON track position thereof, precisely at high speed through the light weight head cartridge or the head assembly correspondingly to the amount of deviation by reading the servo information.

As a result, it is possible to realize the magnetic head certifier and the magnetic disk certifier, which are capable of performing data read/write operation for the track of the disk precisely at high speed.

Incidentally, in the present invention, it is possible to perform a control for maintaining the head in a predetermined position on the track corresponding to an offset with respect to the ON track state by setting the offset in a correction value of the head position. The setting of such offset is used in setting conditions in the head certification or the disk certification.

BRIEF DESCRIPTION OF THE DRAWINGS

FIG. 3(*a*) shows a relation between servo information and data in a track;

FIG. 3(*b*) shows a relation between servo information and track;

FIG. 6(*a*) is a plan view of another head cartridge; and

DESCRIPTION OF THE PREFERRED EMBODIMENTS

Figure 1:
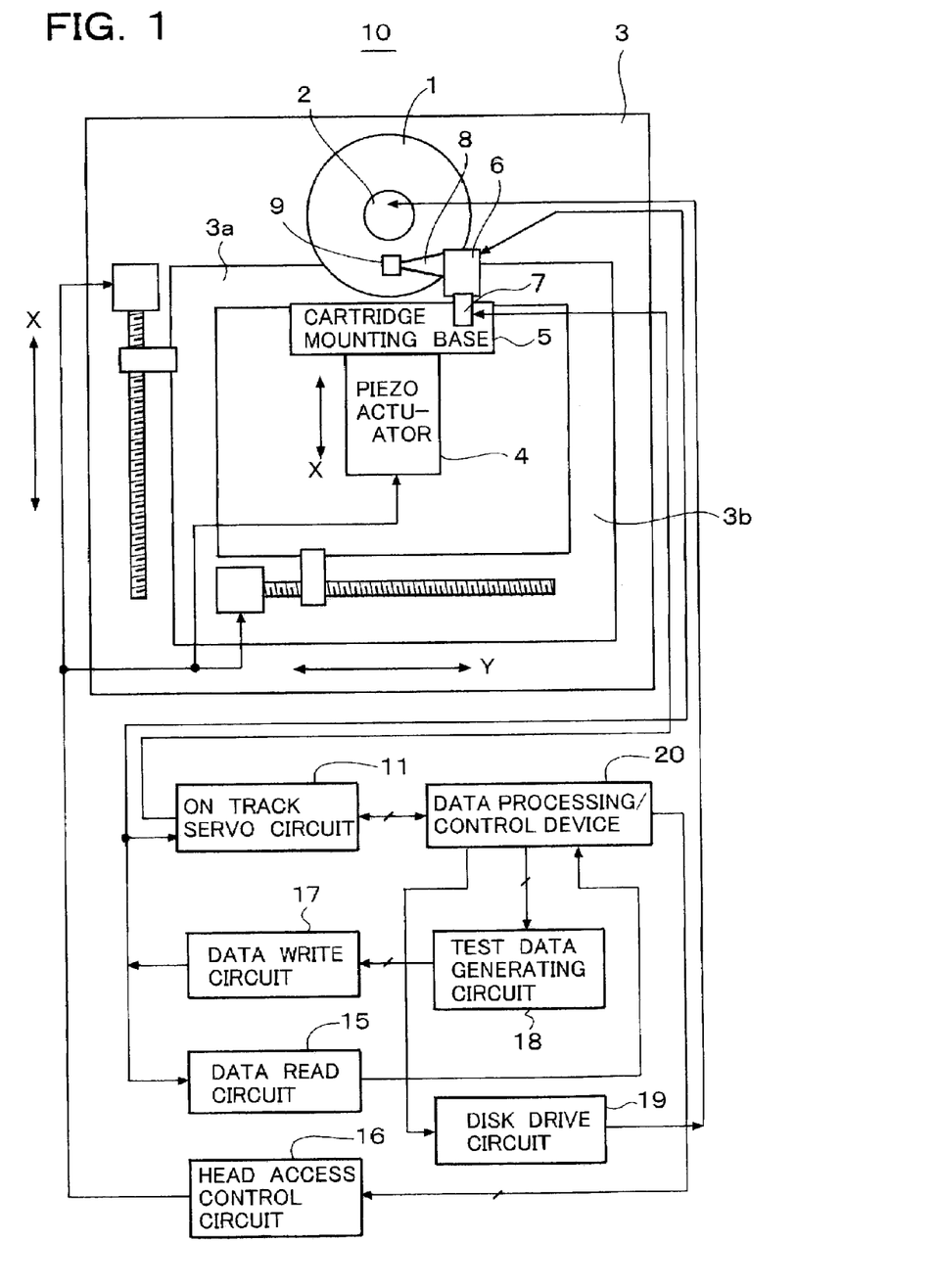
FIG. 1 schematically shows a magnetic disk certifier according to an embodiment of the present invention.

In FIG. 1, a magnetic disk certifier 10 includes a spindle 2 on which a disk to be certified is detachably mounted. An XY stage 3 is provided adjacent to the spindle 2 as a head carriage. The XY stage 3 is composed of an X stage 3a and an Y stage 3b. The X stage 3a is constructed as a radially movable stage for moving a head 9 and a piezo actuator 4 in a radial direction (R) of the disk 1. The Y stage 3b is mounted on the X stage 3a and movable to regulate skew with respect to the head 9. The piezo actuator 4 for finely regulating a position of the head 9 in the X direction is mounted on the Y stage 3b and a cartridge mounting base 5 of the head carriage is connected to a top end of the piezo actuator 4. With such construction, the cartridge mounting base 5 is moved in the X direction by driving the piezo actuator 4 and a fine regulation of a position of the head 9 in the X direction is performed through the head cartridge 6. Incidentally, the X direction is coincident with a line extending in the radial direction R of the disk 1 through a center thereof.

The head cartridge 6 is mounted on the cartridge mounting base 5 through a piezo actuator 7 and an end portion of a base portion of a suspension leaf spring 8 is fixedly mounted on the head cartridge 6. The head (magnetic head) 9 is supported by a portion end of the suspension leaf spring 8 opposite to the base portion thereof. The head 9 is moved in the radial direction R of the disk 1 parallel to X direction to seek a track of the disk 1 and is positioned on the track to read data from the track or write data thereto. This operation is referred to as an access operation.

In this access operation, when the head 9 accesses a certain track or a specific area of a certain track of the disk 1, the piezo actuator 7 performs an ON track servo positioning under control of an ON track servo circuit 11 shown in FIG. 1. That is, the piezo actuator 7 is controlled by the ON track servo circuit 11 such that a position of the head 9 is finely regulated according to a servo signal (servo information) written in the track and read out by the head 9 to dynamically position the head on the track.

The ON track servo positioning is to correct an amount of deviation of the head from a center of a positioning track of the disk 1 on which the head is to be positioned on the basis of a plurality of servo signals set in the positioning track at a predetermined interval and read out sequentially by the head. A moving distance of the piezo actuator 7 for the correction is as small as, for example, several microns or less. Although positions of the servo signals set along the track with respect to the head are varied by undesired eccentric movement of the spindle, etc., the head 9 can be moved in the radial direction R at high speed in response to such movement of the spindle.

Figure 2:
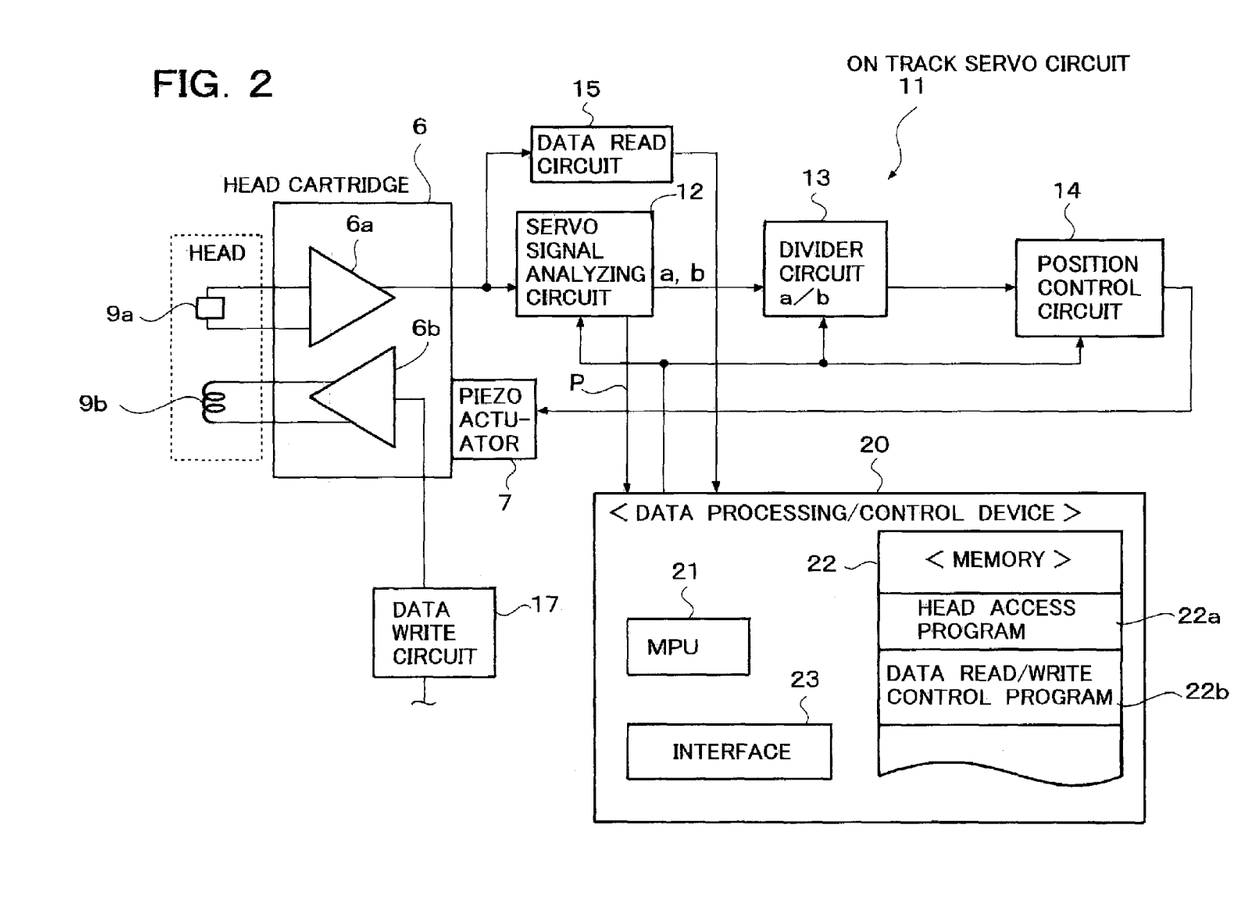
FIG. 2 is a block diagram of an ON track servo circuit shown in FIG. 1.

The head cartridge 6 for detachably mounting the head 9 on the head carriage includes a read amplifier 6a and a write amplifier 6b shown in FIG. 2 therein. The read amplifier 6a amplifies a signal from a MR head 9A. The signal amplified by the read amplifier 6a is outputted to a data read circuit 15 (FIG. 1) and the ON track servo circuit 11.

As shown in FIG. 2, the ON track servo circuit 11 includes a servo signal analyzing circuit 12, a divider circuit 13 and a position control circuit 14, which are controlled by a data processing/control device 20.

Figure 3A:
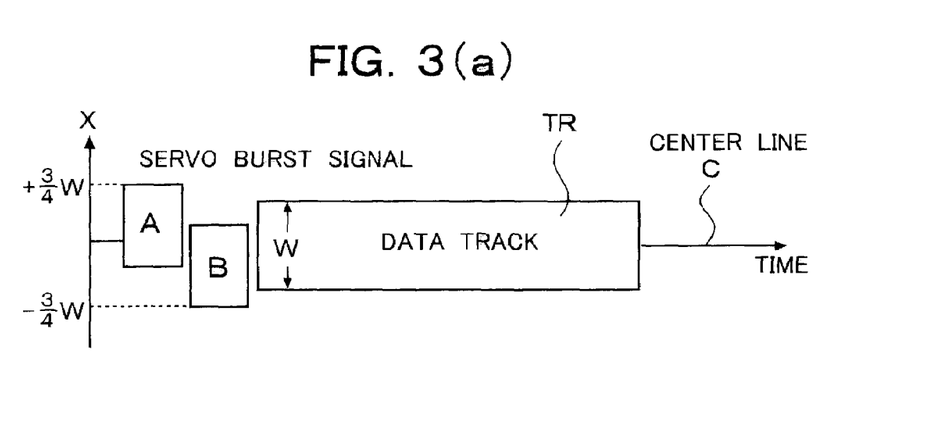

As shown in FIG. 3a, a servo signal is composed of servo burst signals A and B, which are deviated vertically in opposite directions from a center line C of a data track TR by W×¼, where W is width of a track to be read. In response to a read signal from the read amplifier 6a, the servo signal analyzing circuit 12 amplifies the servo burst signal A and the servo burst signal B separately and outputs signals a and b indicating amplitude levels thereof to the divider circuit 13. The vertically deviated servo signals A and B from the center line C of the data track are written along the track sequentially at a predetermined interval as servo information and the servo signal analyzing circuit 12 outputs the signals a and b by amplifying and detecting the servo burst signals A and B written in the track.

The signals a and b indicative of the amplitude levels of the servo burst signals A and B, respectively, are inputted to the divider circuit 13 in which a calculation of a/b is performed. An error signal (a signal indicative of an amount of positional deviation of the head from the center line C of the data track TR) corresponding to the value a/b is outputted from the divider circuit 13 to the position control circuit 14.

The servo signal analyzing circuit 12 generates a track crossing signal or a track position signal P in response to the servo information and sends the signal to the data processing/control device 20.

The position control circuit 14 outputs a drive signal (voltage signal) having a predetermined level for returning the head 9 to the center line C of the data track TR to the piezo actuator 7 in response to the output of the divider circuit 13. Thus, the position of the head 9 is corrected and the head becomes in the ON track state.

When the head 9 is on the center line C of the data track TR, the result a/b of calculation performed by the divider circuit 13 becomes 1, that is, a/b=1, and the drive signal (voltage signal) from the position control circuit 14 is maintained at a constant voltage, so that the position of the head is kept on the center line C of the data track TR.

As a result, the head 9 positioned in the track is dynamically moved toward the center line C of the data track TR at high speed corresponding to a response speed of the piezo actuator 7, so that precise data read/write becomes possible even if undesired eccentric movement of the spindle supporting the disk 1 occurs.

Although the above description is for the case where the head 9 is positioned with respect to the center line C of the data track TR, that is, the case of ON track positioning, it is possible in the present invention to set the head 9 in a position having a predetermined offset with respect to the center line C of the data track TR. This can be achieved by constructing the divider 13 such that the output a/b thereof becomes not 1 as in the described case but k, that is, a/b=k, and constructing the position control circuit 14 such that it generates a drive voltage signal corresponding to a/b=k. By controlling the system such that the drive voltage signal generated by the position control circuit 14 becomes an aimed voltage, it is possible to maintain the head 9 in a position offset from the ON track position, that is, the center line C of the track, by a predetermined distance. Therefore, the present invention is not limited to the ON track control and can be applied to a control for maintaining the head in a predetermined offset position from the ON track position. With the latter control, the present magnetic disk or magnetic head certifier can be applied to certifications of a disk or a head under various conditions.

Figure 3B:
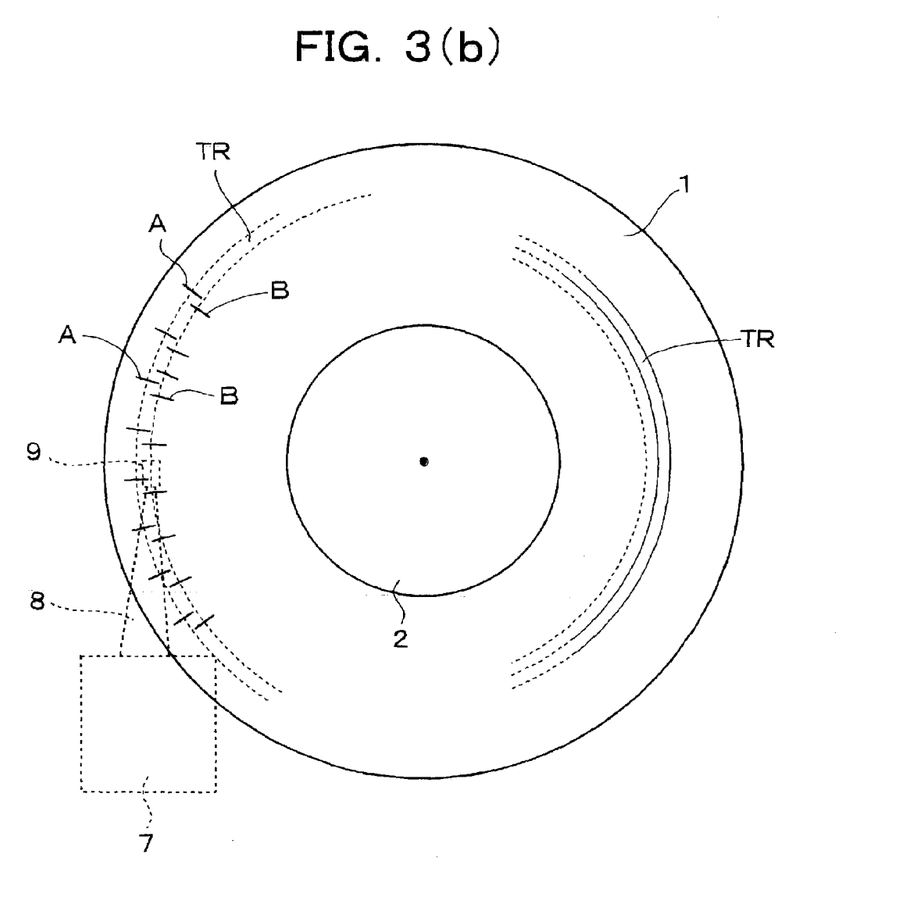

The disk 1 is divided to a plurality (for example, 1024) of sectors and the servo signals A and B are written in each sector as shown in FIG. 3(b). By setting a large number of servo signals (servo information) in respective sectors in this manner, it is possible to return the head 9 whose position is deviated from the center line C of the track back to the ON track position within a time corresponding to about one fourth of one rotation of the disk even when the rotation number of disk is increased to a value within a range from 7000 rpm to 10000 rpm, or even larger. The read/write of data may be performed by initially accessing the track for a time corresponding to about (1+¼) rotations of the disk and, thereafter, the head 9 is maintained in substantially the ON track state by the ON track servo circuit 11.

In order to realize a stable state of head in which a shift of an operation of the head to the read/write operation is allowed after the head is made in the ON track state, about one rotation of the disk is required initially. Therefore, in the above mentioned case, the ON track state is established after about (1+¼) revolutions of the disk 1.

Since the head deviated in position can be returned to the ON track state through about ¼ rotations of the disk, the number of servo signal sets each including the servo signals A and B required practically may be 10 to 20. In view of this, it is not always necessary, in the present invention, to provide the servo signal set in each of the sectors.

Returning to FIG. 1 and FIG. 2, a data read circuit 15 converts the read signal from the read amplifier 6a into binary data and sends it to the data processing/control device 20. A head access control circuit 16 (FIG. 1) drives the XY stage 3 and the piezo actuator 4 in response to a control signal from the data processing/control device 20 to position the head 9 in a predetermined aimed track TR. A test data generating circuit 18 generates a predetermined test data under control of the data processing/control circuit 20 and sends it to a data write circuit 17. The data write circuit 17 generates a write signal according to the test data from the test data generating circuit 18 and writes the data in the predetermined track TR through an inductive head 9B of the head 9 by driving the write amplifier 6b of the head cartridge 6. A disk drive circuit 19 generates a drive signal under control of the data processing/control circuit 20 and outputs the drive signal to the spindle 2.

As shown in FIG. 2, the data processing/control circuit 20 is constructed with a MPU 21, a memory 22, an interface 23, a CRT display and a key board, etc., which are mutually connected through a bus (not shown).

In the memory 22, a head access program 22a and a data read/write control program 22b, etc., are stored.

The MPU 21 executes the head access program 22a to perform a control for controlling the X stage 3a and the Y stage 3b of the XY stage 3 in response to the track crossing signal (or a track positioning signal) received from the servo signal analyzing circuit 12 through the interface 23 by sending a control signal to the head access control circuit 16 to position the head 9 in the aimed track TR and a control for positioning the head 9 in the aimed track TR by finely regulating the position of the head in X direction by driving the piezo actuator 4.

When the positioning of the head in the radial direction R is performed by a track positioning signal, a positioning information indicative of a track position is preliminarily stored in a track of the disk 1 correspondingly to the track position. In such case, the positioning information can be arranged in the position of the servo information as a portion thereof.

When the head 9 is positioned in the aimed track TR, the read/write of test data is performed according to the data read/write control program 22b executed by the MPU 21. After the MPU 21 accesses the track TR, in which the head is positioned, for a time period corresponding to about (1+¼) revolutions of the disk, it enters into the data read control and performs the data read continuously. For the data write, the MPU 21 enters into the data read control and performs the data read continuously after it accesses the track TR for a time corresponding to about (1+¼) revolution of the disk, similarly. The data read/write in such case is performed while the ON track positioning control is performed by the ON track servo circuit 11.

FIG. 4 shows the piezo stage 4 and the head cartridge 6, which are mounted on the Y stage.

A block 80 is fixed onto a surface of a moving table 82 of the Y stage 3b through a plurality of holes 81 by screws, etc. A head 9a to be provided on an upper surface side of the disk 1 is mounted on an end of a support arm 46a through a mounting block 61a of a head cartridge 6a. A head 9b to be provided on a lower surface side of the disk 1 is mounted on an end of a support arm 46b through a mounting block 61b of a head cartridge 6b. The heads 9a and 9b to be provided on the upper and lower surface sides of the disk 1 correspond to the head 9 shown in FIG. 1.

The head cartridges 6a and 6b correspond to the head cartridge 6 shown in FIG. 1. The head cartridge 6a is constituted with the mounting block 61a and the head 9a incorporated in the mounting block 61a and is provided on the upper surface side of the disk 1 and the head cartridge 6b is constituted with the mounting block 61b and the head 9b incorporated in the mounting block 61b and is provided on the lower surface side of the disk 1. The support arms 46a and 46b correspond to the cartridge mounting base 5 shown in FIG. 1.

Figure 5:
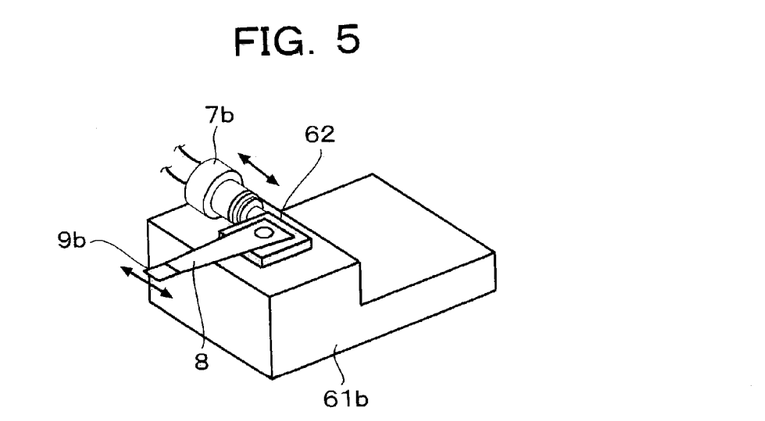
FIG. 5 is a perspective view of the head cartridge.

Piezo actuators 7a and 7b are provided in the head cartridges 6a and 6b, respectively. Although the piezo actuator 7b is not shown in FIG. 4, FIG. 5 shows a construction of the head cartridge 6b. Describing the head cartridge with reference to FIG. 5, which is a perspective view of the head cartridge 6b, the piezo actuator 7b is fixed to one side portion of an upper surface of the mounting block 61b. A base portion of the suspension leaf spring 8 supporting the head 9a is fixedly connected to a rectangular slidable member 62.

The slidable member 62 is mounted on the mounting block 61b and slidable along the upper surface of the mounting block 61*b* to allow the suspension leaf spring 8 having the head 9*b* mounted thereon to move in a direction across the track TR of the disk 1. That is, at least one groove (not shown) is formed in the upper surface of the mounting block 61*b* and a corresponding land portion is formed on the lower surface of the slidable member 62. In the assembled state, the land portion of the slide table is slidably fitted in the groove of the mounting block 61*b* such that the slidable member 62 is slidable with respect to the mounting block 61*b* in the radial direction of the disk 1 at a pitch of about 1 mm to 2 mm. The slidable member 62 is biased in a direction, in which the piezo actuator 7*b* is compressed, by a coil spring provided in the groove of the mounting block 61*b* and a extendable top portion of the piezo actuator 7*a* is in contact with a side face of the slidable member 62. Therefore, the slidable member 62 is moved radially of the disk 1 when the piezo actuator 7*b* fixed to the mounting block 61*b* extends or retracts.

A structure of the head cartridge 6*a* is identical to that of the head cartridge 6*b*.

The support arms 46*a* and 46*b* include slide shafts 44*a* and 44*b* connected to top end portions of the support arms, respectively. The slide shafts 44*a* and 44*b* are supported by slide bearings 45*a* and 45*b*, respectively. Therefore, the support arms 46*a* and 46*b* are slidably supported in the block 80. Further, rear end portions of the slide shafts 44*a* and 44*b* are integrally coupled with the piezo actuators 7*a* and 7*b*, respectively, so that the support arms 46*a* and 46*b* move forward and backward correspondingly to extension and shrinkage of the piezo actuators 7*a* and 7*b* to thereby move the magnetic heads 9*a* and 9*b* radially of the magnetic disk 1. The rear end portions of the piezo actuators 7*a* and 7*b* are coupled to top end portions of regulation screws 43*a* and 43*b*, respectively, so that the positions of the support arms 46*a* and 46*b* can be regulated by the regulation screws 43*a* and 43*b* through the piezo actuators 7*a* and 7*b*. Reference numerals 42*a* and 42*b* depict lead wires for applying voltage signals to the piezo actuators 7*a* and 7*b*, respectively.

With this construction, it is possible to finely move the magnetic heads 9*a* and 9*b* radially of the magnetic disk 1 by applying drive voltages to the piezo actuators 7*a* and 7*b*, respectively.

The piezo stage 4 shown in FIG. 1 corresponds to the piezo actuator 41*a* for moving the head 9*a* on the upper surface side and the piezo actuator 41*b* for moving the head 9*b* on the lower surface side. Further, the suspension spring 8 shown in FIG. 2 corresponds to the suspension spring 8 shown in FIG. 1.

In the embodiment shown in FIG. 4, the piezo actuators 7*a* and 7*b* are provided within the head cartridges 6*a* and 6*b*, respectively, contrary to the case shown in FIG. 1. The piezo actuators 7*a* and 7*b* are fixed to the support arms 46*a* and 46*b*, which correspond to the cartridge mounting base 5, through the mounting blocks 61*a* and 61*b* by screws, etc., respectively. Therefore, the heads 9*a* and 9*b* can be moved radially of the magnetic disk with using the cartridge mounting base 5 (support arms 46*a* and 46*b*) as the reference, respectively, as in the case shown in FIG. 1. In the embodiment shown in FIG. 4, however, the head cartridges 6*a* and 6*b* are not moved as a whole. That is, only the head assembly portion, which includes the suspension spring 8 and the head 9*a* or 9*b*, is moved. Therefore, the load required to move the heads becomes smaller than that required when the cartridge 7 is moved as shown in FIG. 1, so that it becomes possible to increase the moving speed of the heads.

By providing the piezo actuators 7*a* and 7*b* between the mounting blocks 61*a* and 61*b* and the support arms 46*a* and 46*b* and fixing the piezo actuators 7*a* and 7*b* to the support arms 46*a* and 46*b*, respectively, the embodiment shown in FIG. 4 becomes a concrete example of the embodiment shown in FIG. 1 in which the head cartridges 6*a* and 6*b* are moved.

Figure 6A:
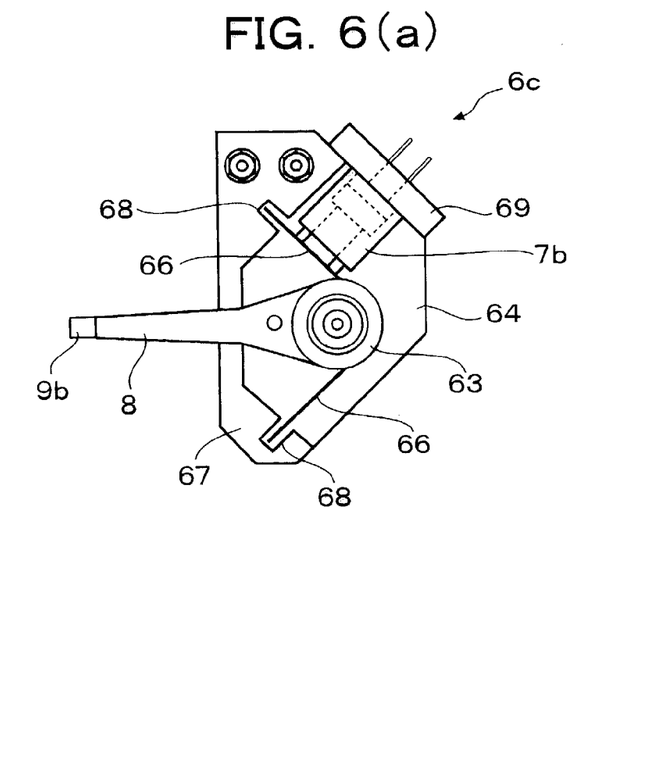
Figure 6B:
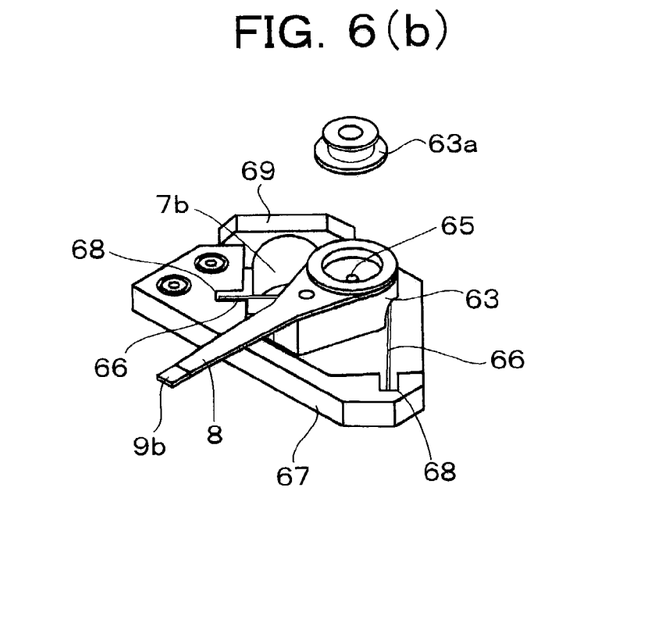
FIG. 6(b) is a perspective view of the head cartridge shown in FIG. 6(a).

FIG. 6(*a*) is a plan view of another head cartridge and FIG. 6(*b*) is a perspective view of the same head cartridge in which a head is rotatable about a hinge and is finely moved in substantially radial direction of the disk.

In FIG. 6(*a*) and FIG. 6(*b*), a head cartridge 6*c* corresponds to the head cartridge 6*b* shown in FIG. 5. A hinge member 63 is used in lieu of the slidable member 62 shown in FIG. 5. A base portion of a suspension leaf spring 8 having a top end portion supporting a head 9*b* is fixed to a mounting block 64 through the hinge 63 member. The mounting block 64 in the form of a deformed heptagonal plate corresponds to the mounting block 61*b* shown in FIG. 5.

The hinge member 63 is rotatably supported by a hinge pin 65 (FIG. 6(*b*)) implanted in the mounting block 64 as a base member, so that the suspension spring 8 mounted on the hinge member 63 is rotated together with the head 9*b* mounted thereon in a direction crossing a track TR of in a disk 1.

That is, the hinge member 63 supported by the hinge pin 65 of the mounting block 64 is rotatable about the hinge pin 65. The hinge member 63 has a pair of leaf springs 66 provided on a side surface thereof and extending linearly with mutual angle thereof being substantially 120 degrees. Top ends of the leaf springs 66 are fitted in grooves 68 formed in a protruded wall 67 of the mounting block 64, respectively.

The piezo actuator 7*b* is fixed to the mounting block 64 by a mounting plate 69 and a top end portion thereof is in contact with an outer side surface of one of the leaf springs 66. When the piezo actuator 7*b* is extended, the leaf springs 66 functions to bias the piezo actuator 7*b* in a retracting direction thereof. That is, the head 9*b* is rotated counter-clockwise direction by the leaf springs 66 when the piezo actuator 7*b* is extended and clockwise direction by the leaf springs when the piezo actuator 7*b* is retracted. Therefore, the head 9*b* is moved along substantially the radial direction of the disk 1. By rotating the suspension spring 8 mounting the head 9*b* on its top end portion by means of the hinge member 63, it is possible to move the head 9*b* at high speed.

Incidentally, a reference numeral 63*a* shown in FIG. 6(*b*) is a cap for movably fitting the suspension spring 8 having the head 9*b* mounted thereon on the hinge pin 65. That is, the suspension spring 8 having the head 9*b* is detachably supported by the hinge pin 65 with an aid of the cap 63*a* fitted in the hinge member 63.

In the described embodiments, the result of calculation performed by the divider circuit 13 is a/b=1. However, it is possible in the present invention to position the head in an arbitrary position of a track by designing the divider circuit 13 such that the output a/b thereof becomes not 1 under control of the position control circuit 14, to thereby perform a certification of a magnetic head or a magnetic disk under more severe conditions. Therefore, the present invention is not limited to the certification by positioning the head in the center of the track.

Further, the read/write of data after the head accesses the track for about (1+¼) revolutions of the disk is one example and the amount of rotation (¼) of the disk to be added to one rotation thereof is determined correspondingly to the response speed of the piezo actuator 7, which controls the position of the head 9. Therefore, the amount of rotation of the disk to be added to one rotation thereof may be larger or smaller than ¼ rotations.

The piezo actuator may be any provided that it can finely move in forward and backward direction. The X stage and the Y stage used in the present invention may be exchanged. That is, either one of them can be arranged to move in the radial direction of the disk.

Further, although the present invention has been described with reference to the magnetic disk certifier mainly, the present invention can be applied to a magnetic head certifier as well.

The invention claimed is:

1. A magnetic head positioning control device for positioning a magnetic head on a predetermined track of a magnetic disk according to a servo information read out from said track, comprising:
   a head cartridge held on a support arm for supporting said magnetic head through a suspension spring;
   a head carriage mounting said head cartridge thereon via said support arm;
   a forward/backward actuator for moving one of said head cartridge and a head assembly having said suspension spring, said forward/backward actuator provided between said suspension spring and said support arm; and
   a control circuit for controlling said forward/backward actuator such that said magnetic head is kept in a predetermined position on said track of said magnetic disk by driving said forward/backward actuator according to an amount of positional deviation of said magnetic head on said track obtained correspondingly to the servo information read out by said magnetic head.

2. A magnetic head positioning control device as claimed in claim 1, further comprising a fine positioning stage provided in said head carriage for supporting said support arm, said fine positioning stage finely regulating a position of said magnetic head on an aimed track by moving said head cartridge when said magnetic head is positioned on said aimed track.

3. A magnetic head positioning control device as claimed in claim 2, wherein said fine positioning stage is a piezo stage including a first piezo actuator for moving the position of said magnetic head along substantially a radial direction of said magnetic disk and said forward/backward actuator comprises a second piezo actuator.

4. A magnetic head positioning control device as claimed in claim 3, wherein the predetermined position on said track is a position in which said magnetic head becomes an ON track state and the servo information is set in a plurality of locations arranged on said track with a predetermined interval.

5. A magnetic head positioning control device as claimed in claim 4, wherein said second piezo actuator is provided in said head cartridge and is adapted to move said suspension spring, the servo information includes two servo burst signals written in positions of the track mutually separated vertically from a center line of the track and corresponding to a sector set on the track and said control circuit includes an amplitude signal generator circuit for generating signals corresponding to amplitudes obtained from the two servo burst signals and a correction signal generator circuit for generating a signal for correcting a deviation of said head from the track according to the signal generated by said amplitude signal generator circuit, said second piezo actuator being driven by said correction signal generator circuit.

6. A magnetic head positioning control device as claimed in claim 5, further comprising a radial moving stage for mounting said piezo stage thereon and moving said piezo stage radially of said magnetic disk, wherein said magnetic head is positioned on an aimed track of said magnetic disk by using said moving stage and said piezo stage.

7. A magnetic head certifier including a magnetic head positioning control device as claimed in claim 1, wherein said magnetic head is certified by holding said magnetic head in said aimed track of said magnetic disk in a predetermined position of said aimed track correspondingly to an amount of deviation of said magnetic head in said aimed track by said magnetic head positioning control device when said magnetic head is positioned in said aimed track and reading data from said aimed track or writing data in said aimed track.

8. A magnetic head certifier as claimed in claim 7, further comprising a fine positioning stage provided in said head carriage for supporting said support arm, said fine positioning stage finely regulating a position of said magnetic head on an aimed track by moving said head cartridge when said magnetic head is positioned on said aimed track.

9. A magnetic head certifier as claimed in claim 8, wherein said fine positioning stage is a piezo stage including a first piezo actuator for moving the position of said magnetic head along substantially a radial direction of said magnetic disk and said forward/backward actuator comprises a second piezo actuator.

10. A magnetic head certifier as claimed in claim 9, wherein the predetermined position on said track is a position in which said magnetic head becomes an ON track state and the servo information is set in a plurality of locations arranged on said track with a predetermined interval.

11. A magnetic head certifier as claimed in claim 10, wherein said second piezo actuator is provided in said head cartridge and is adapted to move said suspension spring, the servo information includes two servo burst signals written in positions of the track mutually separated vertically from a center line of the track and corresponding to a sector set on the track and said control circuit includes an amplitude signal generator circuit for generating signals corresponding to amplitudes obtained from the two servo burst signals and a correction signal generator circuit for generating a signal for correcting a deviation of said head from the track according to the signal generated by said amplitude signal generator circuit, said second piezo actuator being driven by said correction signal generator circuit.

12. A magnetic head positioning control device as claimed in claim 11, further comprising a radial moving stage for mounting said piezo stage thereon and moving said piezo stage radially of said magnetic disk, wherein said magnetic head is positioned on an aimed track of said magnetic disk by using said moving stage and said piezo stage.

13. A magnetic disk certifier including a magnetic head positioning control device as claimed in claim 1, wherein said magnetic head is certified by holding said magnetic head in said aimed track of said magnetic disk in a predetermined position of said aimed track correspondingly to an amount of deviation of said magnetic head in said aimed track by said magnetic head positioning control device when said magnetic head is positioned in said aimed track and reading data from said aimed track or writing data in said aimed track.

14. A magnetic disk certifier as claimed in claim 13, further comprising a fine positioning stage provided in said head carriage for supporting said head cartridge, said fine positioning stage finely regulating a position of said magnetic head on an aimed track by moving said head cartridge when said magnetic head is positioned on said aimed track.

15. A magnetic disk certifier as claimed in claim 14, wherein said fine positioning stage is a piezo stage including a first piezo actuator for moving the position of said magnetic head along substantially a radial direction of said magnetic disk and said forward/backward actuator comprises a second piezo.

16. A magnetic disk certifier as claimed in claim 15, wherein the predetermined position on said track is a position in which said magnetic head becomes an ON track state and the servo information is set in a plurality of locations arranged on said track with a predetermined interval.

17. A magnetic disk certifier as claimed in claim 16, wherein said second piezo actuator is provided in said head cartridge and is adapted to move said suspension spring, the servo information includes two servo burst signals written in positions of the track mutually separated vertically from a center line of the track and corresponding to a sector set on the track and said control circuit includes an amplitude signal generator circuit for generating signals corresponding to amplitudes obtained from the two servo burst signals and a correction signal generator circuit for generating a signal for correcting a deviation of said head from the track according to the signal generated by said amplitude signal generator circuit, said second piezo actuator being driven by said correction signal generator circuit.

18. A magnetic disk certifier as claimed in claim 17, further comprising a radial moving stage for mounting said piezo stage thereon and moving said piezo stage radially of said magnetic disk, wherein said magnetic head is positioned on an aimed track of said magnetic disk by using said moving stage and said piezo stage.

19. A head cartridge mounted on a head carriage via a support arm, for supporting a magnetic head through a suspension spring, said head cartridge comprising said suspension spring movably supported by a base member of said head cartridge, for moving said magnetic head in a direction crossing a track set in a magnetic disk and a piezo actuator for finely moving said magnetic head in the direction crossing said track through said suspension spring.

20. A head cartridge as claimed in claim 19, wherein said suspension spring is supported by a support mechanism movable with respect to said base member and said piezo actuator drives said support mechanism according to a servo information read out from a predetermined track of said magnetic disk.

21. A head cartridge as claimed in claim 20, wherein said support mechanism is slidable with respect to said base member.

22. A head cartridge as claimed in claim 21, wherein said support mechanism is rotatably supported by said base member.

* * * * *